US009967525B2

(12) United States Patent
Niehsen et al.

(10) Patent No.: US 9,967,525 B2
(45) Date of Patent: May 8, 2018

(54) MONITORING CAMERA APPARATUS WITH DEPTH INFORMATION DETERMINATION

(71) Applicant: Robert Bosch GmbH, Stuttgart (DE)

(72) Inventors: Wolfgang Niehsen, Bad Salzdetfurth (DE); Dieter Joecker, Burgthann (DE); Michael Meyer, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 442 days.

(21) Appl. No.: 14/571,795

(22) Filed: Dec. 16, 2014

(65) Prior Publication Data
US 2015/0172606 A1 Jun. 18, 2015

(30) Foreign Application Priority Data
Dec. 16, 2013 (DE) .......................... 10 2013 226 101

(51) Int. Cl.
| | | |
|---|---|---|
| *H04N 7/18* | (2006.01) | |
| *G06K 9/46* | (2006.01) | |
| *G01B 11/24* | (2006.01) | |
| *H04N 13/02* | (2006.01) | |
| *G08B 13/196* | (2006.01) | |
| *G06T 7/579* | (2017.01) | |

(52) U.S. Cl.
CPC ............. *H04N 7/181* (2013.01); *G01B 11/24* (2013.01); *G06K 9/46* (2013.01); *G06T 7/579* (2017.01); *G08B 13/19608* (2013.01); *H04N 13/0221* (2013.01); *G06K 2009/4666* (2013.01); *G06T 2207/10016* (2013.01); *G06T 2207/30232* (2013.01); *G08B 13/1963* (2013.01)

(58) Field of Classification Search
CPC .. H04N 7/181; H04N 13/0207; H04N 13/021; H04N 13/0221; G06T 7/579; G01B 11/24; G06K 9/46; G08B 13/19608
USPC .................................. 348/135, 142, 143, 159
See application file for complete search history.

(56) References Cited

U.S. PATENT DOCUMENTS

| | | | |
|---|---|---|---|
| 2004/0141089 A1 | 7/2004 | Wada | |
| 2008/0204552 A1 | 8/2008 | Niem et al. | |
| 2008/0205791 A1* | 8/2008 | Ideses | H04N 19/597 382/285 |
| 2009/0066791 A1* | 3/2009 | Ono | H04N 5/23238 348/143 |

(Continued)

FOREIGN PATENT DOCUMENTS

| | | |
|---|---|---|
| DE | 102005057569 | 6/2007 |
| GB | 2370443 | 6/2002 |

*Primary Examiner* — Farzana Hossain
(74) *Attorney, Agent, or Firm* — Michael Best & Friedrich LLP

(57) ABSTRACT

A monitoring camera apparatus, having a camera for recording a monitoring region with at least one object from a recording position of the camera. The apparatus also includes an actuator for changing the recording position of the camera and a control device for driving the actuator and the camera. A first image is recordable in a first recording position of the camera, and a second image is recordable in a second recording position of the camera. The first and second images show at least one identical subsection with the at least one object of the monitoring region as a common subsection. An evaluation device for evaluating the images of the camera is configured to determine depth information concerning the at least one object in the common subsection from the first and second images.

9 Claims, 2 Drawing Sheets

(56) References Cited

U.S. PATENT DOCUMENTS

| | | | |
|---|---|---|---|
| 2010/0141772 A1* | 6/2010 | Inaguma | G01S 3/7864 |
| | | | 348/169 |
| 2010/0142852 A1* | 6/2010 | Fujita | G06T 7/593 |
| | | | 382/285 |
| 2010/0229452 A1* | 9/2010 | Suk | F41G 1/54 |
| | | | 42/146 |
| 2011/0255775 A1* | 10/2011 | McNamer | H04N 13/0221 |
| | | | 382/154 |
| 2012/0133818 A1* | 5/2012 | Miyamori | H01F 7/1844 |
| | | | 348/335 |
| 2012/0162374 A1* | 6/2012 | Markas | H04N 13/0221 |
| | | | 348/46 |
| 2012/0242787 A1* | 9/2012 | Oh | H04N 5/232 |
| | | | 348/36 |

* cited by examiner

MONITORING CAMERA APPARATUS WITH DEPTH INFORMATION DETERMINATION

BACKGROUND OF THE INVENTION

The invention relates to a monitoring camera apparatus, having a camera device for recording a monitoring region with at least one object from a recording position of the camera device, having an actuator device for changing the recording position of the camera device, having a control device for driving the actuator device and the camera device, a first image being recordable in a first recording position of the camera device, and a second image being recordable in a second recording position of the camera device, the images showing at least one identical subsection with the at least one object of the monitoring region as a common subsection, and having an evaluation device for evaluating the images of the camera device.

Monitoring cameras are conventionally formed as black and white or color cameras, and are distributed in regions to be monitored, in order to record video sequences or individual images of the regions there, and, for example, to forward them to monitoring centers or store them for future viewing. Conventional monitoring cameras may be arranged statically, or they may be movable. For example, so-called pan/tilt/zoom cameras (PTZ cameras) are known, the viewing direction of which can be modified. Such PTZ cameras are used, for example, in order to monitor wide regions with only a single camera.

Document DE 10 2005 057 569 A1, which forms the closest prior art, discloses for example a device for monitoring with at least one video camera. The video camera is arranged on a swivel and/or tilt apparatus, so that its viewing direction can be aligned with in a controlled way—in this case according to an acoustic signal.

SUMMARY OF THE INVENTION

The subject matter of the invention is a monitoring camera apparatus, as may for example be used in a video monitoring system. In such video monitoring systems, a multiplicity of the monitoring camera apparatuses may be used. For example, more than 10, 30 or 50 of the monitoring camera apparatuses are integrated in the video monitoring system.

The monitoring camera apparatus comprises a camera device, which is formed for example as a black and white or a color camera, and which makes it possible to record an image or optionally in addition an image sequence. The camera device is formed in order to record the image of a monitoring region, i.e. a region in the vicinity of the camera device, at least one object being arranged and/or arrangeable in the monitoring region. In order to record the monitoring region, the camera device is located in a recording position, the optical axis in particular, especially the viewing direction of the camera device, being established by the recording position.

The monitoring camera apparatus furthermore comprises an actuator device, which is formed in order to change the recording position of the camera device. The actuator device may be a one-dimensional actuator device, for example a swivel device, a two-dimensional actuator device, for example a swivel/tilt device, or a multidimensional actuator device. Actuator devices which bring about the change of the recording position, for example with the aid of Cartesian axes, or which are formed as a hybrid of linear axes and swivel axes, are also possible in the scope of the invention.

The monitoring camera apparatus comprises a control device, which is suitable and/or formed on the one hand in order to drive the actuator device, and on the other hand in order to drive the camera device. The control device may be produced in one piece or a plurality of pieces. The control device, or parts thereof, may be arranged centrally, in particular integrated in the monitoring camera apparatus, or may be positioned decentrally, particularly at a distance from the camera device. The control device makes it possible for the camera device to be movable into a first recording position and a second recording position, and for it to be able to respectively record an image there, referred to below as the first image and the second image. The images may also be part of an image sequence. The first and second recording positions are in this case selected in such a way that the first and second images show at least one identical subsection of the monitoring region as a common subsection. In particular, the identical or common subsection is formed as an overlapping subsection in the images. The at least one object is arranged in the common subsection, and further objects may be arranged in the remaining monitoring region.

The monitoring camera apparatus furthermore comprises an evaluation device for evaluating the images of the camera device. The evaluation device may also be arranged centrally or decentrally. The evaluation device may for example be formed as a digital data processing device, in particular a computer, microcontroller, DSP, with a corresponding program.

In the scope of the invention, it is proposed for the evaluation device to be formed in order to determine depth information concerning the at least one object in the common subsection from the first and second images.

The depth information may be limited to one object point of the at least one object, and therefore to a distance determination from the camera device or another reference point to the object point. As an alternative to this, depth information may be determined for a multiplicity of object points of the at least one object, so that three-dimensional depth determination can be derived from the object. In refinements of the invention, a 3D model of a plurality of objects in the monitoring region may even be compiled.

It is in this case one idea of the invention that a change of the recording position of the camera device simultaneously leads to a disparity of the first pixel assigned to the first pixel assigned to the object point in the first image, and the second pixel in the second image. Together with an offset of the image planes of the first image and the second image relative to the object, it is possible to determine depth information of the object point.

Usually, in conventional monitoring cameras, only a two-dimensional image of the monitoring region is transmitted, but no information concerning the depth of the imaged monitoring scene is obtained. According to the invention, however, it is proposed to determine the depth information using the monitoring camera apparatus by evaluating images from different recording positions of the camera device relative to the at least one object in the monitoring region. Such evaluation algorithms are known to the person skilled in the art from the literature, for example by the keyword "Structure from Motion—SfM".

In a preferred configuration of the invention, the first and second recording positions are formed in such a way that a first image plane and a second image plane, offset with respect thereto, can be assigned to them. Provision is made for a first pixel of an object point of the object on the first image plane to have a disparity with respect to the second pixel of the same object point on the second image plane.

In a preferred implementation of the invention, which is particularly simple and therefore stable, the optical axis of the camera device in the first recording position is offset by a base value parallel to the optical axis of the camera device in the second camera position. In this configuration, the camera device is arranged in the first and second recording positions in a similar way to two human eyes, and offset with respect to one another by the base value. Precisely in this configuration, a multiplicity of algorithms are known, so that the determination of the depth information can be implemented particularly simply, and therefore stably.

In a preferred design configuration of the invention, the monitoring camera apparatus has a housing, the camera device and the actuator device being arranged in the housing. The control device and the evaluation device may be fully or partially arranged in the housing; as an alternative they are positioned fully or partially outside the housing. The housing is particularly preferably formed as a domed housing, the domed housing having a base body and a transparent dome, the camera device being arranged in the housing in such a way that it can be moved by the actuator device, and the optical axes extending through the transparent dome. In particular, the housing with the actuator device and the camera device are formed as a statically arranged unit.

It is particularly preferred for the monitoring camera apparatus to be formed as a ceiling camera, wall camera or mast camera. These designs for monitoring camera apparatuses have now become established, ceiling cameras being used for example in department stores or buildings, wall cameras being installed in a region halfway up high house walls, and mast cameras often being used on open land to monitor the surroundings on support masts.

In one possible configuration, the actuator device has a motorized linear axle, by means of which the camera device is displaced by the base value, in order to occupy the two recording positions. In particular, the direction of movement of the linear axle is oriented perpendicularly to the optical axis. In this configuration, the base value is particularly simple to determine, since it corresponds to the movement distance of the linear axle.

It is, however, preferred in terms of design for the actuator device to have a main swivel device with a main swivel axis and an auxiliary swivel device with an auxiliary swivel axis. The main swivel device and the auxiliary swivel device are respectively formed at least as a swivel device, but may also be produced as rotation devices. Because the main swivel axis and the auxiliary swivel axis are arrangeable offset parallel with respect to one another, they can not only swivel the camera device, but in addition offset it parallel to itself. Owing to the parallel offset, it is possible to make the base value particularly large, so that the depth resolution and therefore the accuracy of the determination of the depth information are improved.

It is in this case particularly preferred for the auxiliary swivel device, the main swivel device and the camera device to form a kinematic chain, the auxiliary swivel device being arranged on the main swivel device and the camera device being arranged on the auxiliary swivel device. In the event of rotation of the main swivel device, the auxiliary swivel device with the camera device is therefore swiveled as well. In the event of swiveling of the auxiliary swivel device, on the other hand, only the camera device is swiveled, but the main swivel device is not moved. In this configuration, it is possible first to move the camera position into an intermediate position by means of the main swivel device, and subsequently to move it into the second recording position using the auxiliary swivel device, the optical axes of the first and second recording positions being arranged parallel with respect to one another.

In one possible design configuration of the invention, the main swivel axis is arranged off-center with respect to the camera device, in particular off-center with respect to the main plane of an objective of the camera device and/or a sensor plane of an image sensor of the camera device. The auxiliary swivel axis, on the other hand, is preferably arranged inside the camera device. In this way, by means of the main swivel axis, it is possible to offset the camera device by means of an eccentric swivel movement, and subsequently correct the orientation of the optical axis with the aid of the auxiliary swivel device.

In one possible design configuration of the invention, the main swivel device comprises a base plate, which can be swiveled about the main swivel axis by the main swivel device. The auxiliary swivel device is arranged with the camera device eccentrically on the base plate, so that the auxiliary swivel axis is positioned offset parallel with respect to the main swivel axis.

In a particularly economical embodiment of the invention, the main swivel device and the auxiliary swivel device are driven together by means of a common motor and/or positively driven with respect to one another by means of gearing, the positive driving being formed in such a way that the orientations of the optical axes in the first and second positions are oriented parallel to one another. As an alternative, two different drive devices, in particular motors, are used.

In a particularly preferred embodiment of the invention, the main swivel axis and/or the auxiliary swivel axis is formed as a pan swivel axis and/or perpendicularly to a base plate or mounting plate of the monitoring camera apparatus and/or of the housing. In this way, there is an offset of the optical axes by the base value in the horizontal direction, which is particularly simple to process as a transverse disparity using the image processing algorithms.

In a preferred configuration of the invention, the evaluation device is formed by means of programming and/or circuit technology in order to determine depth information on the basis of a triangulation method, using the first and second images as well as the knowledge of the base value between the image planes. Optionally in addition, the correspondences of the pixels of the object or of the object points of the object may be recorded by methods of optical flow.

BRIEF DESCRIPTION OF THE DRAWINGS

Other features, advantages and effects of the invention may be found in the following description of a preferred exemplary embodiment of the invention, as well as in the appended figures, in which.

DETAILED DESCRIPTION

Figure 1:
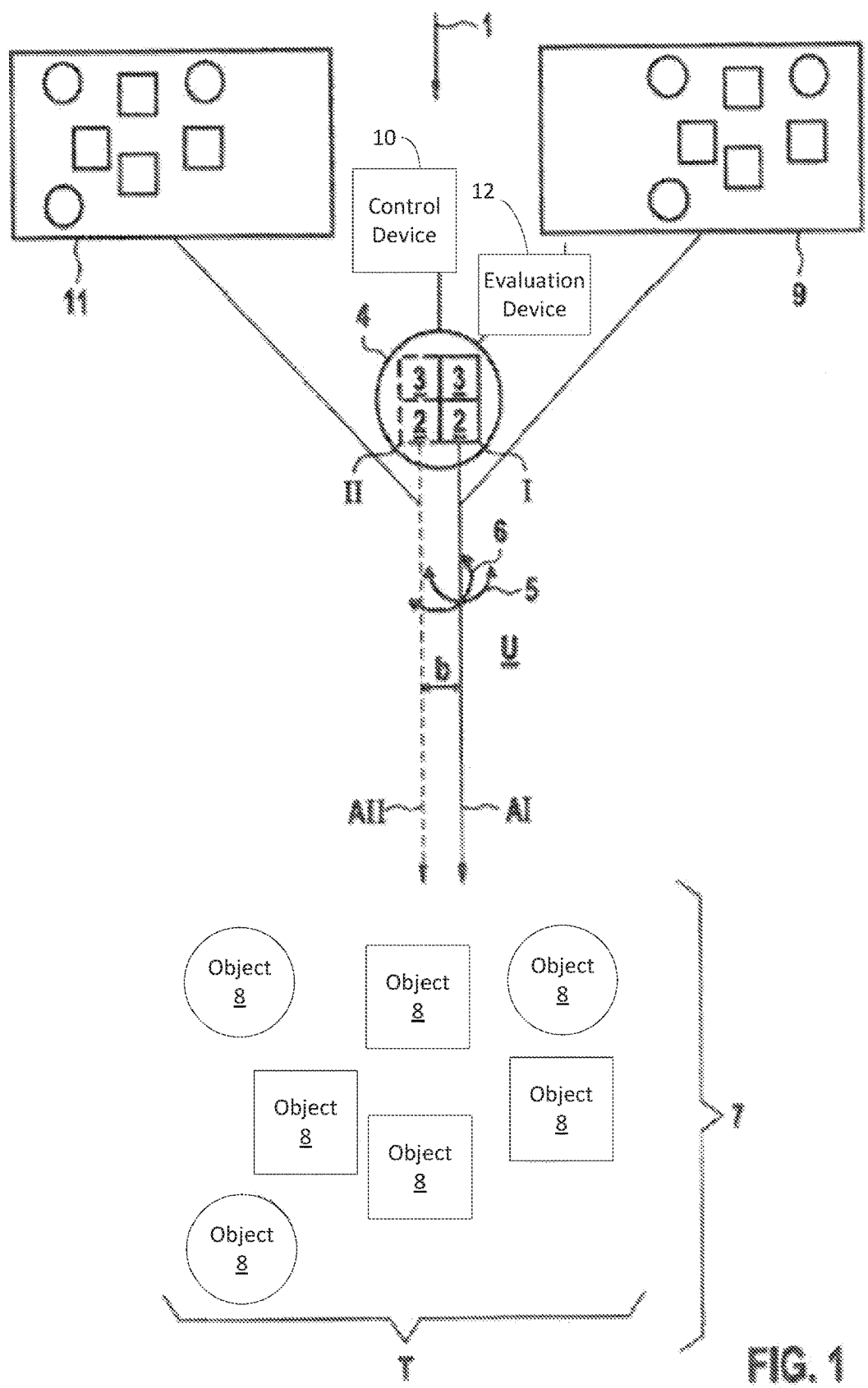
FIG. 1 shows a schematic representation of a monitoring camera apparatus in a monitoring region as an exemplary embodiment of the invention.

FIG. 1 shows a highly schematic representation of a monitoring camera apparatus 1 as an exemplary embodiment of the invention. The monitoring camera apparatus 1 has a camera device 2 and an actuator device 3, which are arranged together in a housing 4. The monitoring camera apparatus 1 is formed for example as a so-called dome camera, which is fastened on a ceiling. The actuator device 3 makes it possible to move the camera device 2 in the recording position relative to the housing 4 and/or relative to an environment U. For example, the actuator device 3 may implement a swivel and/or inclination function (pan/tilt), in which case the camera device 2 can be swiveled according to arrow 5 in a plane parallel to a fastening plane, for example a wall or a ceiling, of the housing 4, or inclined by swiveling perpendicularly thereto according to arrow 6. It is also possible that the swiveling operations can be carried out endlessly, so that they constitute rotations.

The monitoring camera apparatus 1, in particular the camera device 2, is directed at a monitoring region 7, in which a multiplicity of objects 8, for example cabinets, tables, automobiles, etc. are arranged. In a first camera position I, the monitoring region 7 is recorded by the camera device 2 and a first image 9 is output by the camera device.

The monitoring camera apparatus 1 comprises a control device 10 for driving the actuator device 3 and the camera device 2. The control device 10 drives the actuator device 3, in order to move from the first recording position I into a second recording position II, and record a second image 11 in the second recording position II.

The first and second recording positions I, II are selected in such a way that the optical axes AI, AII of the camera device 2 are offset parallel with respect to one another by a base value b. The effect achieved by the parallel offset by the base value b is that stereoscopic viewing by the monitoring camera apparatus 1 is made possible, and depth information relating to the objects 8 can be derived from the first image 9 and the second image 11 by joint evaluation. The derivation of the depth information is based on triangulation, in which case the depth information can be determined by known formulae as a function of the base value b and the deviation of the position of the pixels of the objects 8' in the images 9, 11.

With knowledge of the base value b and of the camera parameters of the camera device 2, the distance between the camera device 2 and the object points of the objects 8, which belong to the pixels of the imaged objects 8', can be determined as depth information. During transfer from the recording position I to the recording position II, however, at least one subsection of the monitoring region 7 must be represented as a common subsection (T) on both images 9, 11, since otherwise no correspondence can be established between the images 9, 11. It is possible for the correspondences of the pixels with respect to one another to be calculated by methods of optical flow, although other known methods for solving the correspondence problem are also possible. The calculation of the depth information on the basis of triangulation is carried out in an evaluation device 2. The depth information, in particular the distance to an individual object point, can be calculated in the evaluation device 12. This may advantageously be used in order, for example, to focus the camera device 2 onto the object point or onto a depth region around the object point. As an alternative to this, the evaluation device 12 may construct a 3D model of the monitoring region 7. This may advantageously be used in order, for example, to facilitate the quality of image processing algorithms, in particular for a video content analysis, or in order to make it easier for the user to compile a site plan.

In terms of design, the control device 10 and the evaluation device 12 may also be arranged in the housing 4, so that the latter can be integrated as a functional unit, for example in a building. As an alternative to this, the control device 10 and the evaluation device 12 may also be arranged decentrally. Hybrid forms are also possible, so that for example the control device 10 is arranged in the housing 4 and the evaluation device 12 is arranged decentrally.

In the monitoring camera apparatus in FIG. 1, it is for example possible for the actuator device 3 to be formed in order to swivel the camera device 2 about a swivel axis which is perpendicular to the image plane. The parallel offset of the viewing directions between the first recording position I and the second recording position II may, for example, be implemented by a linear axle as part of the actuator device 3, which is oriented perpendicularly to the optical axes.

Figure 2A:
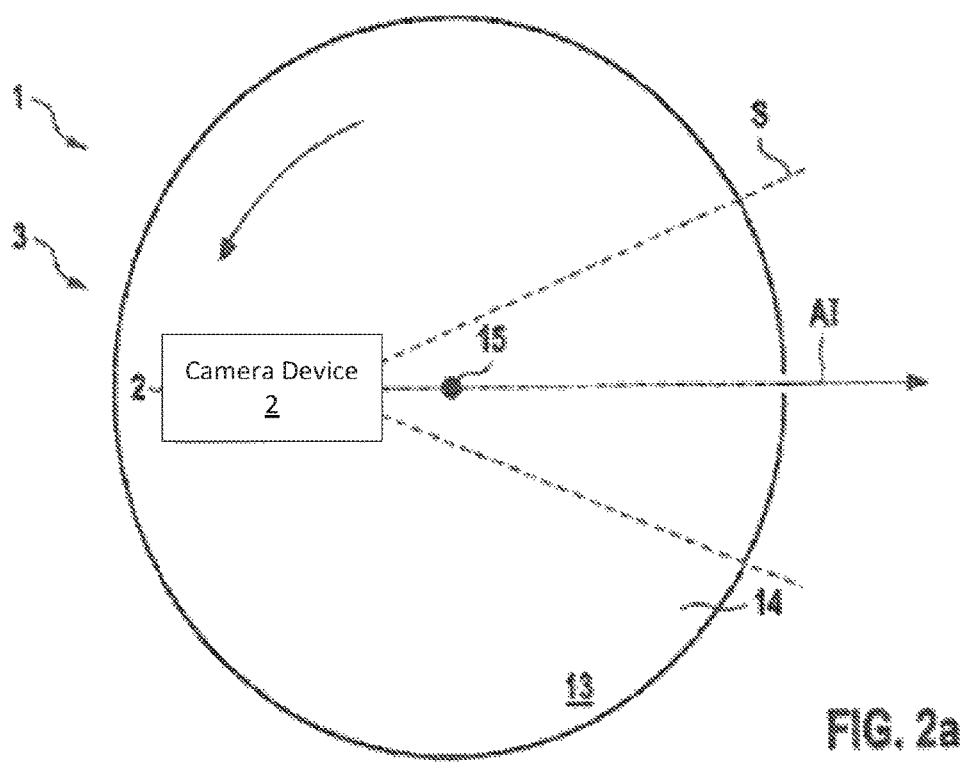
FIGS. 2a,b show the monitoring camera apparatus in FIG. 1 in a schematic representation to explain the functionality of the depth information determination.
Figure 2B:
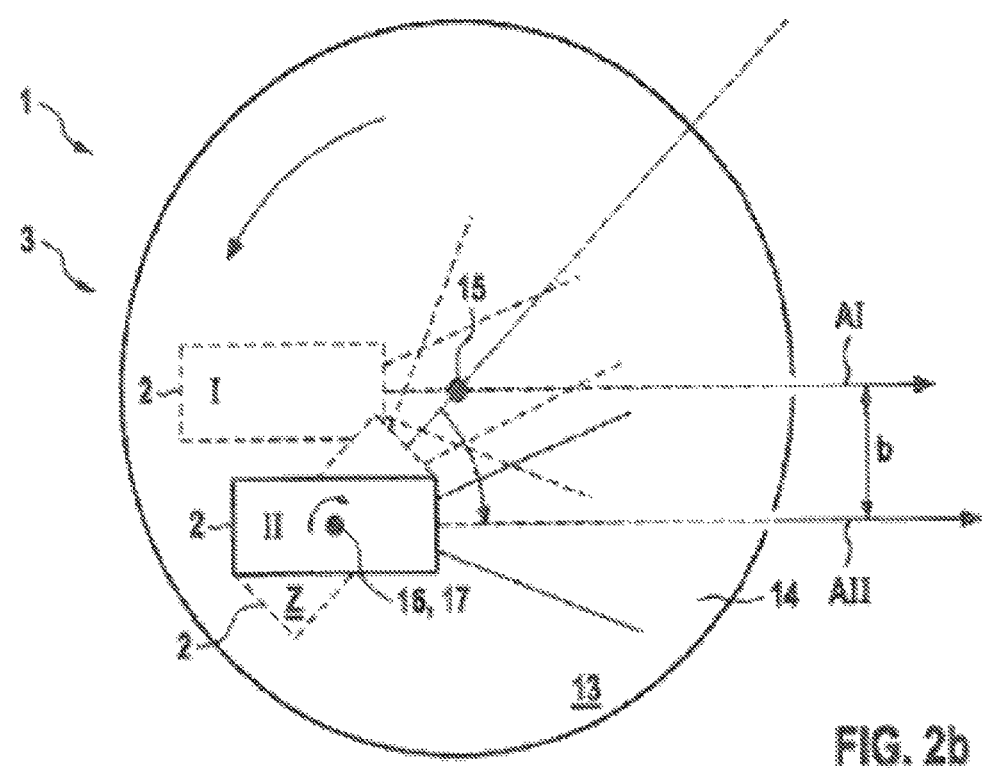

FIGS. 2*a,b* show the monitoring camera apparatus 1 with a different actuator device 3 in a schematic plan view from above, the camera device 2 being shown with its field of view S and the optical axes AI and AII (FIG. 2*b*).

The camera device 2 is arranged on the actuator device 3, which in this exemplary embodiment has a swivelable base plate 13 as a main swivel device 14, which can be swiveled about a main swivel axis 15. In FIG. 2*b*, the camera device 2 swiveled about the main swivel axis 15 is represented by dashed lines, the camera device 2 first being transferred from the first recording position I into an intermediate recording position Z by swiveling about the main swivel axis 15. The actuator device 3 furthermore has an auxiliary swivel device 16, which permits swiveling of the camera device 2 about an auxiliary swivel axis 17. During an additional swivel of the camera device 2 about the auxiliary swivel axis 17, the camera device 2 is transferred into the recording position II, the optical axis AII being parallel to the optical axis AI by the base value b. The auxiliary swivel axis 17 extends through the camera device 2. The camera device 2, on the other hand, is arranged off-center, or eccentrically, with respect to the main swivel axis 15.

In one design implementation, it is possible for the main swivel device 14 and the auxiliary swivel device 16 to be moved by a common motor, or for the auxiliary swivel device 16 to be formed as a stepper motor or as suitable couple-able gearing, which transmits the swiveling of the main swivel device 14, in particular of the base plate 13, to the camera device.

1 monitoring camera apparatus
2 camera device
3 actuator device
4 housing
5 arrow
6 arrow
7 monitoring region
8 objects
9 first image
10 control device
11 second image
12 evaluation device
13 base plate
14 main swivel device
15 main swivel axis
16 auxiliary swivel device
17 auxiliary swivel axis
I first camera position/recording position
II second recording position
b base value
S field of view U environment
Z intermediate recording position

The invention claimed is:

1. A monitoring camera apparatus, the apparatus comprising:
   a camera for recording a monitoring region with at least one object from a recording position of the camera,
   an actuator for changing the recording position of the camera, the actuator including
      a main swivel device, the main swivel device having a main swivel axis arranged off-center with respect to the camera, and
      an auxiliary swivel device arranged on the main swivel device, the auxiliary swivel device having an auxiliary swivel axis parallel to the main swivel axis and extending through the camera,
   a control device, including a first electronic processor, for driving the actuator and the camera, a first image being recordable in a first recording position of the camera, and a second image being recordable in a second recording position of the camera, the first and second images showing at least one identical subsection with the at least one object of the monitoring region as a common subsection, and
   an evaluation device, including a second electronic processor, for evaluating the first and second images of the camera, the evaluation device configured to determine depth information concerning the at least one object in the common subsection from the first and second images,
   wherein the camera is arranged on the auxiliary swivel device and has a first optical axis when the camera is in the first recording position and a second optical axis parallel to the first optical axis when the camera is in the second recording position.

2. The monitoring camera apparatus according to claim 1, wherein the first and second recording positions are formed in order to generate, for an identical object point of the at least one object, a disparity of the pixels of the object point on the first image plane assigned to the first recording position and on the second image plane assigned to the second recording position.

3. The monitoring camera apparatus according to claim 1, wherein the first optical axis of the camera and the second optical axis of the camera are offset by a base value.

4. The monitoring camera apparatus according to claim 1, further comprising a housing, and wherein the camera and the actuator are arranged in the housing.

5. The monitoring camera apparatus according to claim 1, wherein the monitoring camera apparatus is formed as a ceiling camera, wall camera or mast camera.

6. The monitoring camera apparatus according to claim 1, wherein the main swivel device is configured to swivel a base plate about the main swivel axis, the auxiliary swivel device with the camera being arranged eccentrically with respect to the main swivel axis on the base plate.

7. The monitoring camera apparatus according to claim 6, wherein the main swivel device and the auxiliary swivel device are operated via a common motor, are positively driven with respect to one another by gearing, or both.

8. The monitoring camera apparatus according to claim 1, wherein the main swivel axis, the auxiliary swivel axis, or both are formed as a pan swivel axis, perpendicularly to a base plate or mounting plate of the monitoring camera apparatus, or both.

9. The monitoring camera apparatus according to claim 1, wherein the evaluation device is formed in order to determine depth information on the basis of a triangulation method.

* * * * *